C. Hinz.
Chisel.
No. 93,534. Patented Aug. 10, 1869.
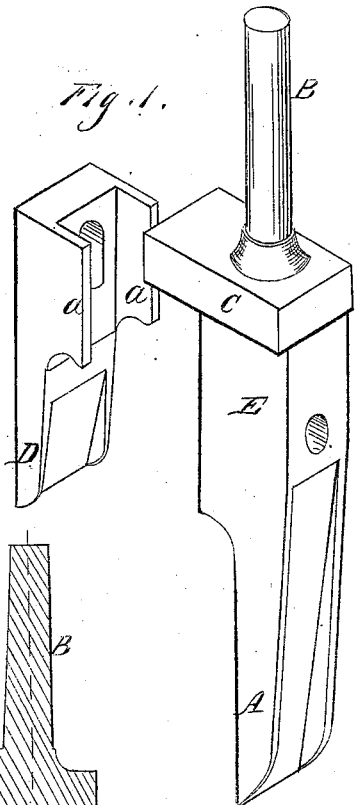
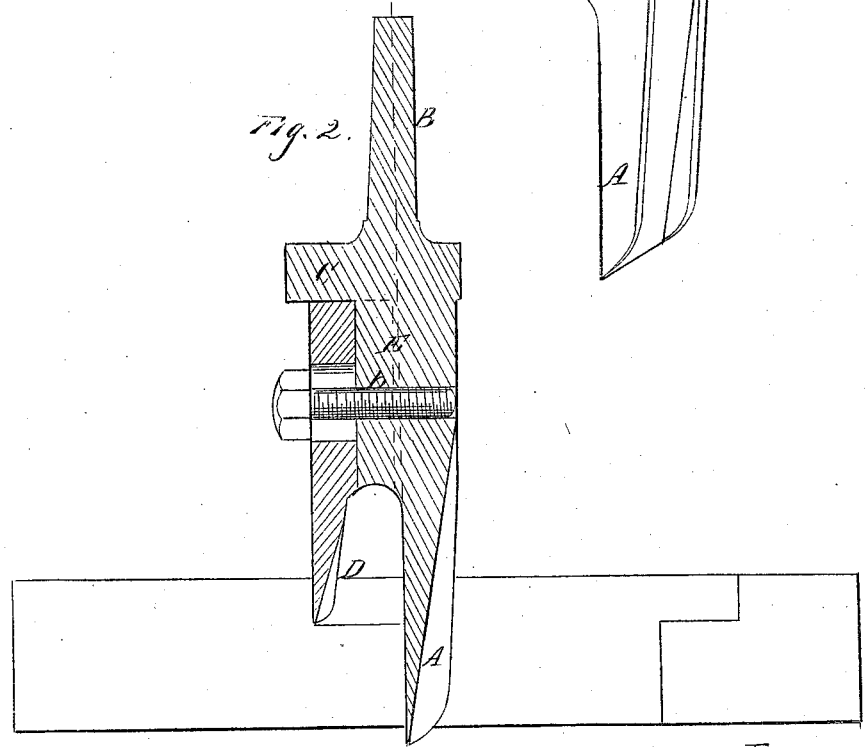
Witnesses.
Geo. N. Strong,
J. L. Boone
Inventor.
Carl Hinz
By Dewey & Co.
His Attorney.

United States Patent Office.

CARL HINZ, OF SAN FRANCISCO, CALIFORNIA.

Letters Patent No. 93,534, dated August 10, 1869.

---

IMPROVEMENT IN MORTISING-CHISEL.

---

The Schedule referred to in these Letters Patent and making part of the same.

---

*To all whom it may concern:*

Be it known that I, CARL HINZ, of the city and county of San Francisco, State of California, have invented an Improved Mortising-Chisel; and I do hereby declare the following description and accompanying drawings are sufficient to enable any person skilled in the art or science to which it most nearly appertains, to make and use my said invention or improvements without further invention or experiment.

The object of my invention is to provide an improved chisel, to be used for cutting mortises designed for receiving pulleys, or other pieces of mechanism, which require a shallow mortise cut around the main one for the purpose of receiving the flange, or other device, by which the pulleys are attached to the timber; and consists of a mortising-chisel, having a shorter adjustable one above it, and placed far enough from it to give the desired width of shallow mortise. By adjusting the shorter chisel, any desired depth or width of shallow mortise can be given, the whole being performed at one operation, with great accuracy and celerity.

To more fully illustrate and describe my invention, reference is had to the accompanying drawings, forming a part of this specification, of which—

Figure 1 is a perspective view.

Figure 2 is a sectional elevation.

Similar letters of reference in each of the figures indicate like parts.

A is a mortising-chisel, having the upper end, E, of much greater thickness than the lower or cutting-end.

Between the stem B and the chisel is a block, C, which is larger than the but-end of the chisel.

The stem is placed so that if a straight line were drawn along the front or face of the chisel A, and extended, it would cut the stem through the centre, in order that the pressure might be equally distributed.

D is a short chisel, wider than A, having wings $a\ a$ on each side, forming a groove between them.

The chisel D is placed upon the face of the upper or large end E of the chisel A, so that the chisel A will be received in the groove between the wings, the wings passing down on each side.

The two are then secured together by a screw, $b$.

The hole in the chisel D, through which the screw passes, is elongated, so that the chisel may be moved up and down, as desired, in order that the chisel A may make a deeper or more shallow mortise, and still bring the chisel D to the desired depth to form the shallow mortise.

When it is desired to make the shallow mortise longer than the regular set of the chisels allows, the screw $b$ can be loosened, and strips of wood or other material placed between the two chisels, and thus remove them further apart.

With this device, I am able to cut mortises for pulleys and other pieces of mechanism, by the same operation, and with the same tool, making the mortise of any form desired.

Having thus described my invention,

What I claim, and desire to secure by Letters Patent, is—

The combination, with a mortising-chisel, A, of an adjustable chisel, D, the parts being constructed and arranged substantially as described.

In witness whereof, I have hereunto set my hand and seal.

CARL HINZ. [L. S.]

Witnesses:
GEO. H. STRONG,
J. L. BOONE.